Aug. 21, 1962     M. W. MARIEN     3,050,354
PISTON AND PISTON RING ASSEMBLY
Filed July 10, 1959
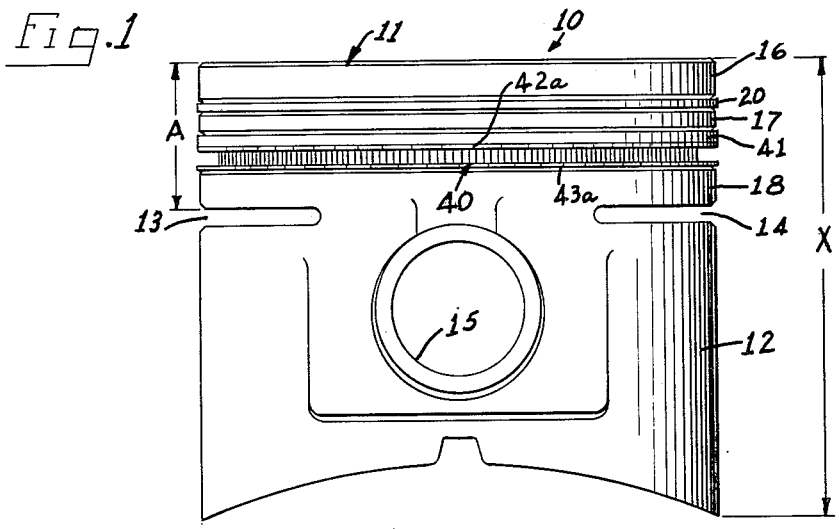
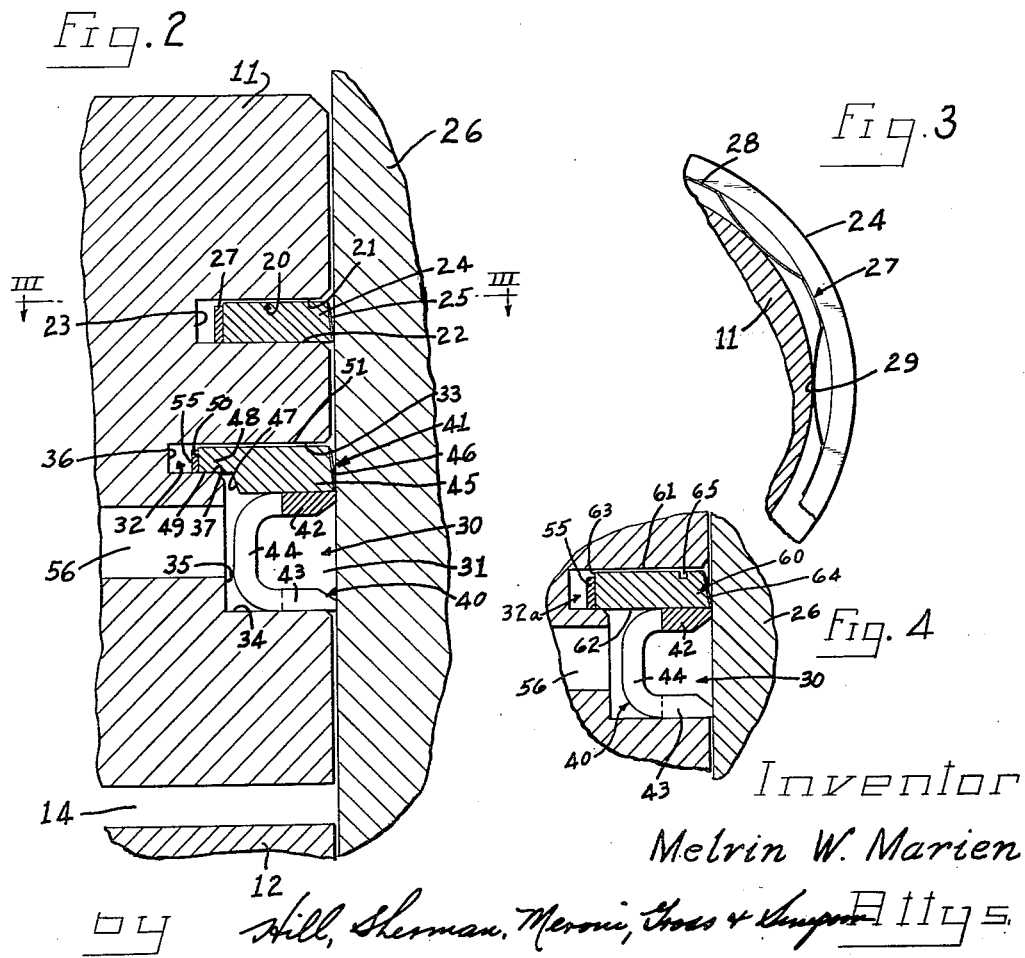
Inventor
Melvin W. Marien
by Hill, Sherman, Meroni, Gross & Simpson Attys.

United States Patent Office 3,050,354
Patented Aug. 21, 1962

3,050,354
PISTON AND PISTON RING ASSEMBLY
Melvin W. Marien, Brentwood, Mo., assignor to
Ramsey Corporation, a corporation of Ohio
Filed July 10, 1959, Ser. No. 826,277
4 Claims. (Cl. 277—188)

The present invention relates broadly to the piston art, and is more particularly concerned with a novel piston having a unique ring groove arrangement therein housing a new and improved ring assembly to provide substantial reductions in piston height without sacrifices in piston performance.

It is an important aim of the present invention to provide a piston wherefrom a piston land and ring groove is eliminated without reduction in piston ring sealing effectiveness and effecting a piston head height reduction generally of the order of one-third.

Another object of this invention lies in the provision of a piston having only a pair of ring grooves therein, one of the grooves having a non-rectangular cross section and receiving therein a compression ring and oil control ring assembly.

Another object of the instant invention is to provide a piston wherein one groove thereof houses a compression ring and oil control ring in axially abutting relation, the compression ring in this groove being particularly effective to prevent pressure losses from the combustion chamber through the piston drain opening communicating with the groove.

A further object of this invention lies in the provision of a piston ring assembly comprising a compression ring and oil control ring, the compression ring being formed with a reduced thickness portion receivable in a groove extension of substantial radial depth and the main body portion of the compression ring being housed with the oil control ring in a single groove having substantial axial depth and reduced radial depth.

A further object of this invention is to provide a piston structure with head and skirt portions, the head portion having a first circumferential groove therein and a second circumferential groove axially spaced from the first groove, the second groove being of substantially greater axial length than the first groove to seat therein a ring assembly performing sealing and oil control functions.

A still further object of the instant invention lies in the provision of a piston ring assembly to be located in a piston ring groove having portions of different radial depths, the assembly featuring an oil control ring having axially spaced leg members, and a compression ring to be supported by the oil control ring and provided with a reduced thickness portion along the inner diameter thereof receivable in the piston ring groove portion of relatively lesser radial depth, the ring assembly when located in the groove performing both sealing and oil control functions and permitting substantial reductions in piston height.

An even further object of the invention is to provide a compression piston ring structure in the form of an annular member of solid metal construction having a main body portion of generally constant and uniform thickness from the outer diameter of the annular member radially inwardly therefrom, the annular member being additionally provided with a reduced thickness portion along the inner diameter thereof extending radially outwardly from said inner diameter to provide a tongue integral with the main body portion and of relatively lesser radial length.

Other objects and advantages of the invention will become more apparent during the course of the following description, particularly when taken in connection with the accompanying drawings.

In the drawings, wherein like numerals designate like parts throughout the same:

FIGURE 1 is an elevational view of a piston constructed in accordance with the principles of this invention and mounting a piston ring assembly provided in accordance with the instant teachings;

FIGURE 2 is a fragmentary sectional view of piston and cylinder structure, showing in further detail the piston and piston ring assembly of this invention;

FIGURE 3 is a horizontal sectional view taken substantially along the line III—III of FIGURE 2 for purposes particularly of illustrating an exemplary form of expander ring which may be used to back the compression rings shown in FIGURE 2; and FIGURE 4 is a fragmentary sectional view in the manner of FIGURE 2, and showing another form of compression ring bottoming on an oil control ring in a stepped groove.

Briefly stated, the invention of the instant application is directed first to a piston having a novel piston ring groove arrangement and configuration which entirely eliminates one of the conventional three grooves in the piston head without sacrifice in operational efficiency and providing among its advantages a substantial reduction in overall piston height. The head portion of the piston of this invention is provided with only two grooves axially spaced from one another, the upper groove in the piston head being generally rectangular in cross section and seating a compression ring which may take the form known to the art. However, axially downstream from the rectangular compression ring groove is a groove of substantially greater axial length presenting a stepped configuration in cross section. The second groove has an entrance portion or main portion of substantial radial and axial dimensions and connecting with the entrance portion and extending radially inwardly therefrom is a reduced dimension or leg portion having a lesser radial depth or length and lesser axial length or dimension than the entrance or main portion of the second groove. Generally, the radial length of the entrance portion of the second groove is less than the radial length of the first groove; however, the overall radial length of the entrance and leg portions of the second groove are greater than the radial length of the first groove.

The instant invention further provides a novel piston ring assembly essentially entirely contained within the described second circumferential groove in the piston. The piston ring assembly comprises an oil control ring which may take various shapes, although generally in any form employed there is provided axially spaced resilient leg members, one of which bottoms against the base or floor of the second groove and the other of which abuts a compression ring of new and improved configuration, whereby the compression ring is effectively supported and performs an efficient sealing function. As will be described in detail hereinafter, the compression ring of this invention has a main body portion of generally constant and uniform thickness which seats on one of the axially spaced leg members of the control ring, and extending radially inwardly from the main body portion of the compression ring is a reduced thickness tongue portion located along the inner diameter of the ring. When the parts are assembled, the reduced thickness tongue portion on the compression ring fits into or is at least partially received in the radially extending leg portion of the second circumferential groove. Other features of this invention and additional advantages obtained therefrom will be specifically described during the course of the disclosure now to follow.

Referring now first to FIGURE 1 of the drawings, there is shown a piston generally designated by the numeral 10 and comprising a head or ring belt portion 11 and skirt portion 12. The head and skirt portions may be separated by a pair of disconnected horizontal slots 13 and 14, and formed on the skirt portion 12 is a wrist pin receiving boss 15, as is the practice in the art. It is not essential that the piston 10 be provided with the horizontal expansion slots 13 and 14, although to facilitate an understanding of the relative height or axial length of the head and skirt portions, the head portion 11 may be considered as above or in one axial direction from the slots 13 and 14, and the skirt portion 12 as below or in the opposite axial direction from said slots. Although not shown, the skirt portion 12 may have a vertical or axially extending slot therein which terminates in one of the slots 13 or 14 and extends downwardly therefrom to a point above the lower limit or bottom of the skirt portion 12.

Referring now also to FIGURE 2, the piston 10 of this invention is formed with not more than three lands 16, 17 and 18, in contrast with known pistons which are of a four land construction with three grooves therebetween. The intermediate or middle land 17 may be seen in the drawings to be of relatively lesser height or axial length than the lands 16 and 18, and further, in the exemplary form of piston shown, the lands 16 and 18 have essentially the same axial dimensions. As is apparent, however, in a piston structure not embodying the horizontal slots 13 and 14 only two lands 16 and 17 would be provided.

The lands 16 and 17 define therebetween a first circumferential groove 20 of a general configuration known to the art, and comprising generally straight and parallel upper and lower faces or surfaces 21 and 22, respectively, terminating at their radial inward ends in an axial or vertical wall 23. Contained within the first circumferential groove 20 is a compression ring 24 preferably having a tapered outer diameter 25 and fabricated with a radial thickness less than the depth of the groove 20.

Urging the compression ring 24 radially outwardly so that its outer diameter 25 is in sealing relation with the inner diameter of cylinder 26 is an expander ring 27 which may have the configuration shown in FIGURE 3. The ring 27 may be seen to be of generally serpentine shape in plan, being provided with humps or radially outwardly facing portions 28 bearing against the inner diameter of the compression ring 24 and generally smoothly curved radially inwardly facing portions 29 contacting or bottoming against the vertical wall 23 of the circumferential groove 20. By the configuration of expander ring 27 shown, the compression piston ring 24 is urged radially outwardly into continuous contact with the inner diameter of the cylinder during relative reciprocation between the piston 10 and cylinder 26 to prevent loss of pressure in the combustion chamber. While good results have been obtained with the expander ring 27 herein illustrated, the invention should not be considered as limited thereto since other configurations produce satisfactory results.

Axially downstream of the first circumferential groove 20 and on the opposite side of the land 17 is a second circumferential groove generally designated by the numeral 30. The groove 30 may be seen to be of more or less stepped configuration in cross section and is comprised of two sections, an entrance portion 31 and connecting leg portion 32. The entrance portion 31 is defined by a pair of axially spaced, relatively straight and parallel surfaces 33 and 34 connecting with an axially disposed or vertical back wall 35. The entrance portion may be observed to have a height or axial length substantially greater than that of the first circumferential groove 20, and further, the radial length of the entrance portion 31 from the piston circumference to the wall 35 is less than the radial length of the first groove 20 from the piston circumference to the wall 23.

The connecting groove portion 32 extends radially inwardly and constitutes a relatively small continuation of the entrance portion 31. The leg portion 32 is defined as to its radial length from an imaginary vertical extension of the wall 35 to a wall surface 36 having a vertical or upright face. The height or axial length of the leg portion 32, on the other hand, is defined by the wall 33 of the entrance portion 31 and a generally parallel and relatively flat wall surface 37.

Accordingly, as shown in FIGURE 2 and as described above, the second circumferential groove 30 presents in cross section generally an h configuration with the arch portion of the h being provided by the entrance portion 31 and the leg portion 32 constituting the upright or leg extension from the arch. As illustrated, the section of the second circumferential groove 30 adjacent the lower surface of the land 17 has a radial dimension greater than that of the first circumferential groove 20, although the height or axial length of the leg portion 32 of the groove 30 is less than the height or axial length of the first circumferential groove 20, while the radial length of the entrance portion 31 of the groove 30 is less than the same dimension of the groove 20 and the height of the entrance portion 31 or its axial length is of the order of at least four times that of the height of the first circumferential groove 20.

Essentially entirely contained within the second circumferential groove 30 is an oil control ring generally indicated at 40 supporting a compression ring 41. As earlier indicated, the oil control ring 40 may take various shapes, and although the configuration shown works particularly well in the instant application, other shapes may be employed with satisfactory results.

The oil control ring 40 shown comprises a pair of axially spaced leg members or supporting portions 42 and 43 connected along their inner diameters or radially inwardly facing ends by a generally curved axial spacer 44. As appears in FIGURE 1, the axially spaced leg members 42 and 43 have vertically staggered slots 42a and 43a therein to provide circumferential expansibility in the oil control ring 40. The leg members 42 and 43 may further be tapered radially inwardly of their outer ends, and said ends generally have essentially flat surfaces for rubbing contact with the inner diameter of the cylinder 26. As also appears from FIGURE 2, the circumferential width of the oil control ring 40 is slightly less than the radial length of the entrance portion 31 of the second circumferential groove 30, so that the axial spacer 44 of the oil control ring is generally radially outwardly spaced from the wall 35 to a small degree.

The compression ring 41 supported by the oil control ring 40 and urged axially thereby into closely spaced or even abutting relation with the wall surface 33 of the second groove 30 may be seen to have a more or less stepped configuration in cross section for complementary engagement with the leg portion 32 of the groove 30. The compression ring 41 is formed with a main body portion 45 of generally constant and uniform thickness radially inwardly from its tapered outer diameter 46 to a tapered ledge 47 located somewhat more than one-half the circumferential width of the ring 41 from the outer diameter 46 thereof. The tapered ledge or counter-bore 47 provides a tongue portion 48 along the inner diameter of the ring 41, and it may be seen that the tongue portion or reduced thickness portion 48 has generally straight or flat right angle surfaces at the end thereof. Thus, radially inwardly of the ledge 47 is a generally flat bottom surface 49 generally lying flush with the surface 37 of the groove leg portion 32, a generally flat or upright wall surface 50 providing the inner circumferential surface of the ring 41, and a generally flat upper surface 51 which is substantially parallel with the surface 33 defining the upper axial limit of the second circumferential groove 30. As is now apparent, the ledge portion 47 limits radial inward movement of the compression ring 41 with respect to the piston body 10.

The compression ring 41 is continuously urged radially outwardly to maintain its tapered outer circumferential surface 46 in sealing contact with the inner diameter of the cylinder 26 by means of an expander ring 55. The expander ring may have generally the serpentine configuration of the expander ring 27 in the first circumferential groove, and for this reason is not specifically illustrated herein. However, as was noted in connection with the expander ring 27, other types and shapes of expander ring may be employed.

The second circumferential groove 30, and particularly the entrance portion 31 thereof, is in communication with a drain hole or drain opening 56 extending radially inwardly therefrom to the interior of the piston 10. The drain opening 56 functions in the customary manner to vent oil wiped from the cylinder inner diameter by the oil control ring.

In connection with the description directed toward the upper compression ring 24 it was stated that this ring provides an effective seal to prevent losses of pressure in the combustion chamber. The compression ring 41, on the other hand, provides a secondary seal against combustion chamber pressure losses, and in this regard it is important to note that by the combination of an oil control ring 40 and compression ring 41 with a tongue portion 48 thereon, there is essentially no likelihood of gases being vented through the oil drain opening 56. It is further important to note, particularly by reference to FIGURE 1, that the instant land and groove arrangement with novel piston ring assembly 40—41 in the second circumferential groove 30 provides a substantial reduction in piston height. Specifically, by elimination of one land and one groove the piston belt or head portion height can by itself be reduced to the order of 35 percent. The relatively short piston belt height provided by this invention is designated in FIGURE 1 by the dimension "A," while the overall piston height is identified therein as "X." The instant piston 10 is accordingly characterized by a substantially reduced overall height and a piston belt or head portion also of a markedly reduced height. On the other hand, the skirt portion 12 is also of a lesser axial dimension, and this can also be reduced so that a piston is provided having an overall height approaching about one-half that characterizing the present pistons. Particularly for use in modern engines having larger cylinder bores and shorter strokes is the disclosed piston of especially important application.

As noted hereinabove, the instant invention is not restricted to the particular expander rings 27 and 55 disclosed, nor is it required that the oil control ring 40 have the particular shape illustrated. In addition, the horizontal slots 13 and 14 separating the piston head portion 11 and skirt portion 12 are not always necessary. Further, it may not at all times be required that a stepped compression ring 31 be employed in the groove 30. As for example, and referring to FIGURE 4 wherein like numerals have been applied to like parts, a compression ring 60 of generally known structure may be utilized. This ring has essentially flat upper and lower surfaces 61 and 62, a flat and upright inner diameter 63, and a tapered outer diameter 64. An annular groove 65 may be formed in the uppersurface 61 thereof. Groove portion 32a of the circumferential groove 30 may be of slightly increased axial height, as contrasted with the groove portion of FIGURE 2. The function and operation of the ring 60 is essentially the same as the ring 41 of FIGURES 1 and 3.

It is therefore now apparent that various changes and modifications can be made to the structures herein disclosed without departing from the novel concept of the present invention.

I claim as my invention:

1. A piston ring assembly for location in a piston ring groove having portions of different radial depths, comprising an oil control ring having connecting axially spaced resilient leg members, and a compression ring to be located in contact with one of said leg members and axially urged by the oil control ring, said compression ring being provided with a reduced thickness portion along the inner diameter thereof receivable in the piston ring groove portion of relatively lesser radial depth, the ring assembly when located in the groove performing both sealing and oil control functions and permitting substantial reductions in piston height.

2. A piston ring assembly for location in a piston ring groove having portions of different radial depths, comprising an oil control ring having connecting axially spaced resilient leg members, and a compression ring to be supported by the oil control ring and provided with portions of differing thickness, the relatively thicker portion being normally supported by one leg member of the oil control ring and the relatively thinner portion being receivable in the piston ring groove portion of relatively lesser radial depth, the ring assembly when located in the groove performing both sealing and oil control functions and permitting substantial reduction in piston height.

3. A compression piston ring structure, comprising an annular member of solid metal construction having a main body portion of generally constant and uniform thickness from the outer diameter of the annular member radially inwardly therefrom, and a reduced thickness portion along the inner diameter of the anular member extending radially outwardly from said inner diameter to provide a tongue integral with the main body portion, the body portion having an inclined surface at one end thereof connecting with the reduced thickness portion, and said latter portion being of relatively lesser radial length than the body portion.

4. A piston ring assembly for location in a piston ring groove having portions of different radial depths, comprising an oil control ring generally U-shaped in cross-section and having a pair of axially spaced resilient leg portions and an axially extending strut connecting said leg portions to urge said portions axially, and a compression ring lying against one of said leg portions and resiliently urged thereby against one wall of the groove, said compression ring being partially received in the piston ring groove portion of relatively lesser axial depth.

References Cited in the file of this patent

UNITED STATES PATENTS

| | | |
|---|---|---|
| 1,710,485 | McKone | Apr. 23, 1929 |
| 2,459,395 | Smith | Jan. 18, 1949 |
| 2,481,553 | Williams | Sept. 13, 1949 |
| 2,488,697 | Ackerman | Nov. 22, 1949 |
| 2,563,971 | Stein | Aug. 14, 1951 |
| 2,566,603 | Dykes | Sept. 4, 1951 |
| 2,621,092 | Clark | Dec. 9, 1952 |
| 2,634,179 | Haverly | Apr. 7, 1953 |
| 2,638,390 | Neeme | May 12, 1953 |
| 2,886,385 | Marien | May 12, 1959 |
| 2,951,732 | Brenneke | Sept. 6, 1960 |

FOREIGN PATENTS

| | | |
|---|---|---|
| 448,916 | Great Britain | June 17, 1936 |
| 833,377 | France | Oct. 20, 1938 |
| 420,647 | Italy | Mar. 13, 1939 |
| 556,487 | Italy | Feb. 6, 1957 |
| 202,033 | Switzerland | Mar. 16, 1939 |